United States Patent [19]

Yokoyama et al.

[11] Patent Number: 4,563,139
[45] Date of Patent: Jan. 7, 1986

[54] MOLD CLAMPING MECHANISM FOR TIRE CURING MACHINES

[75] Inventors: Kageki Yokoyama; Itaru Amano, both of Kobe, Japan

[73] Assignee: Kabushiki Kaisha Kobe Seiko Sho, Kobe, Japan

[21] Appl. No.: 572,254

[22] Filed: Jan. 20, 1984

[30] Foreign Application Priority Data

Jan. 27, 1983 [JP] Japan .................. 58-12334

[51] Int. Cl.⁴ ............................. B29H 5/02
[52] U.S. Cl. ......................... 425/47; 425/32
[58] Field of Search ............... 156/112, 125, 404; 425/28 R, 34 R, 34 A, 47, 25, 38, 34, 32, 33, 35, 39, 44, 46

[56] References Cited

U.S. PATENT DOCUMENTS

| | | | |
|---|---|---|---|
| 1,375,660 | 4/1921 | Kilborn | 425/47 |
| 2,198,493 | 4/1940 | Freeman | 425/47 |
| 3,336,635 | 8/1967 | Soderquist | 425/33 |
| 3,522,626 | 8/1970 | Balle | 425/38 |
| 3,646,191 | 2/1972 | Zangl | 264/315 |
| 3,669,581 | 6/1972 | Maurer et al. | 425/34 A |
| 3,686,391 | 8/1972 | Rawls | 264/315 |
| 3,734,656 | 5/1973 | Balle | 425/34 R |
| 3,770,858 | 11/1973 | Ireland et al. | 425/22 |
| 3,827,839 | 8/1974 | Pechacek et al. | 425/34 R |
| 3,830,605 | 8/1974 | Pechacek | 428/28 R |
| 3,870,443 | 3/1975 | Schatz | 425/28 R |
| 3,914,975 | 10/1975 | Kawano | 72/389 |
| 3,918,861 | 11/1975 | Klose | 425/34 R |
| 3,936,251 | 2/1976 | Billey | 425/38 |
| 4,013,389 | 3/1977 | MacMillan | 425/47 |
| 4,022,554 | 5/1977 | MacMillan | 425/25 |
| 4,035,118 | 7/1977 | MacMillan | 425/25 |
| 4,043,724 | 8/1977 | Schubert | 425/47 |
| 4,212,605 | 7/1980 | MacMillan | 425/47 |
| 4,332,536 | 6/1982 | Singh et al. | 425/34 R |
| 4,453,902 | 6/1984 | Imbert | 425/28 R |

Primary Examiner—Jay H. Woo
Assistant Examiner—Timothy W. Heitbrink
Attorney, Agent, or Firm—Oblon, Fisher, Spivak, McClelland & Maier

[57] ABSTRACT

A mold clamping mechanism for a tire curing press, including a press base, a lower mold cavity provided on the press base, an upper mold cavity opposingly mounted to the lower mold cavity and vertically movable toward and away from the lower mold cavity, center mechanisms provided at the center of said upper and lower mold cavities, respectively, a lock mechanism for releasably locking the upper and lower mold cavities to each other, and a mold pressing mechanism located beneath the lower mold cavity for directly pressing same, the mold clamp mechanism a mechanism for resiliently supporting the lower mold cavity on the press base; mechanism for fixing a lower mold in the lower mold cavity to the press base; and a mold pressing mechanism interposed between the lower mold cavity and the lower mold.

6 Claims, 8 Drawing Figures

MOLD CLAMPING MECHANISM FOR TIRE CURING MACHINES

BACKGROUND OF THE INVENTION

1. Field of the Invention

This invention relates to a mold clamping mechanism useful on a tire curing press for clamping upper and lower molds during tire vulcanizing operation, and more particularly to a mold clamping mechanism of a stable and sturdy construction which can maintain a high degree of concentricity and parallelism of upper and lower molds in a facilitated manner.

2. Description of the Prior Art

As well known in the art, for vulcanizing to shape a green tire which has been placed in upper and lower molds of a tire curing press, it is necessary to clamp the upper and lower molds in a closed state against a high internal pressure which develops within the molds. In this regard, there have been used various conventional or improved mold clamp means. In a typical conventional mold clamp mechanism, opening and closure as well as clamping of an upper mold relative to a lower mold is attained by upward or downward movement of a main beam on which the upper mold is mounted, lifting the main beam up and down by a side link which is operated by a crank gear, a cam groove and so forth and mounted on side plates provided on opposite sides of the tire vulcanizing press. The use of this sort of conventional tire clamp mechanism generally results in a disadvantageously large increase in size and complication in construction, coupled with an inferior press efficiency and possibilities of imperfect alignment of closed upper and lower molds due to flexure of the main beam. Above all, it has been a great problem for the conventional mold clamping mechanism to comply with the requirement that the concentricity and parallelism of the upper and lower molds should be strictly maintained at the time of mold closure and clamping in a tire curing operation.

In place of the above-mentioned conventional mold clamp mechanism, there have been employed in the art improved mold clamp mechanisms which are provided with a mold pressing means separate from a mold lift means which serves to open and close upper and lower molds, and in which the molds are opened and closed by vertically moving an upper mold up and down relative to a lower mold on a press base, clamping the upper and lower molds directly by a pressing means which is provided in the vicinity of the molds to generate a mold clamping force. Although there are various types of improved mold clamp mechanisms, it would be appropriate here to take a recent example which is provided with a press base having a lower mold cavity fixed thereon; a lower mold assembly received in the lower mold cavity and including a platen support, a heat insulator, a platen, and a mold, the lower mold assembly being vertically movably supported by a hydraulic cylinder which is mounted on a lower portion of the press base; and an upper mold cavity supported on a vertically movable beam and incorporating therein an upper mold assembly opposed to the lower mold assembly. After closing and locking the upper mold cavity on the lower mold cavity, the lower mold assembly is lifted up and clamped against the upper mold assembly by the hydraulic cylinder.

The above-described type of improved mold clamp mechanism has certain advantages such as utilizing a relatively short stroke length of the hydraulic cylinder, simplifying to some extent an upper mold support structure which is free of the reaction of mold clamping force, and simplifying and reducing the size and cost of the curing machine as a whole. However, on the contrary, a mold clamp mechanism of the type which has a lower mold assembly vertically movably mounted on a press base has a serious problem regarding the concentricity and parallelism of upper and lower mold assemblies which are the most important factors to be considered in the tire curing operation and failing to attain a high degree of alignment of the upper and lower molds which is essential to improving the quality of the ultimate products. Besides, regarding simplifications in construction and maintenance which have thus far been strongly demanded, it becomes necessary to mobilize the heat source for the movable lower mold, for example, to provide a movable support structure for a steam pipe by the use of a rotary joint, a flexible tube or the like, inviting as a result further problems such as complication in construction, damage of component parts by repeated reciprocal movements and fortification of seal construction.

SUMMARY OF THE INVENTION

It is an object of the present invention to eliminate the above-mentioned drawbacks of a mold clamp mechanism of the type which is provided with a mold pressing means separate from a mold clamp mechanism serving to open and close molds in upper and lower mold cavities on a tire curing machine.

It is a more particular object of the present invention to provide a mold clamp mechanism of the sort mentioned above, which can ensure a high degree of alignment in a mold closing operation without impairing the concentricity and parallelism of the molds and at the same time can clamp the closed molds by directly pressing the lower mold.

It is another object of the invention to provide a mold clamp mechanism of the sort mentioned above, which is simple and compact in construction and facilitates in maintenance.

According to the present invention, there is provided a mold clamp mechanism for a tire curing press including a press base, a lower mold cavity provided on the press base, an upper mold cavity opposingly mounted to the lower mold cavity and vertically movable toward and away from the lower mold cavity, center mechanisms provided at the center of said upper and lower mold cavities, respectively, lock means for releasably locking the upper and lower mold cavities to each other, and mold pressing means located beneath the lower mold cavity for directly pressing same, the mold clamp mechanism comprising means for resiliently supporting said lower mold cavity on the press base; means for fixing a lower mold in the lower mold cavity to the press base; and mold pressing means interposed between the lower mold cavity and the lower mold.

The above and other objects, features and advantages of the present invention will become apparent from the following description and appended claims, taken in conjunction with the accompanying drawings which show by way of example an illustrative embodiment of the invention.

DETAILED DESCRIPTION OF THE PREFERRED EMBODIMENT

Figure 1:
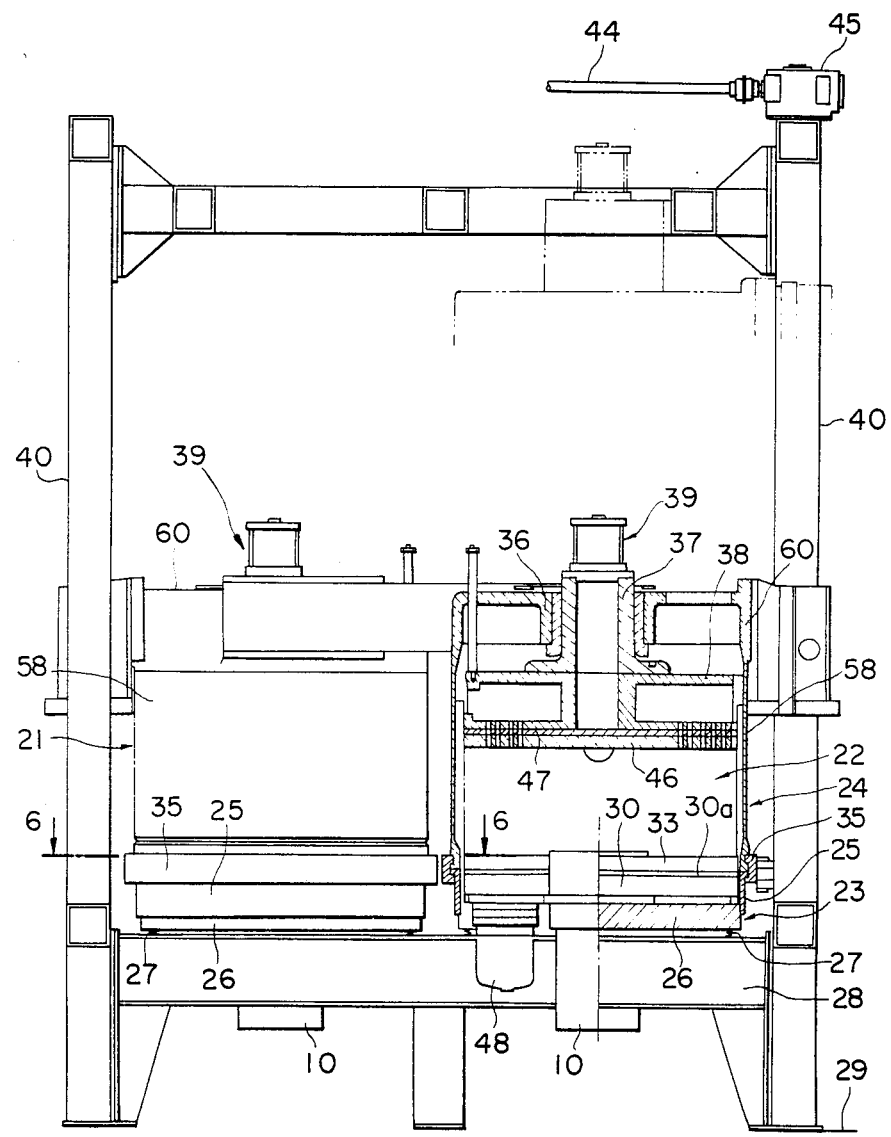
FIG. 1 is a partly sectioned front view of a dual mold type tire curing press to which the present invention is applicable.
Figure 2:
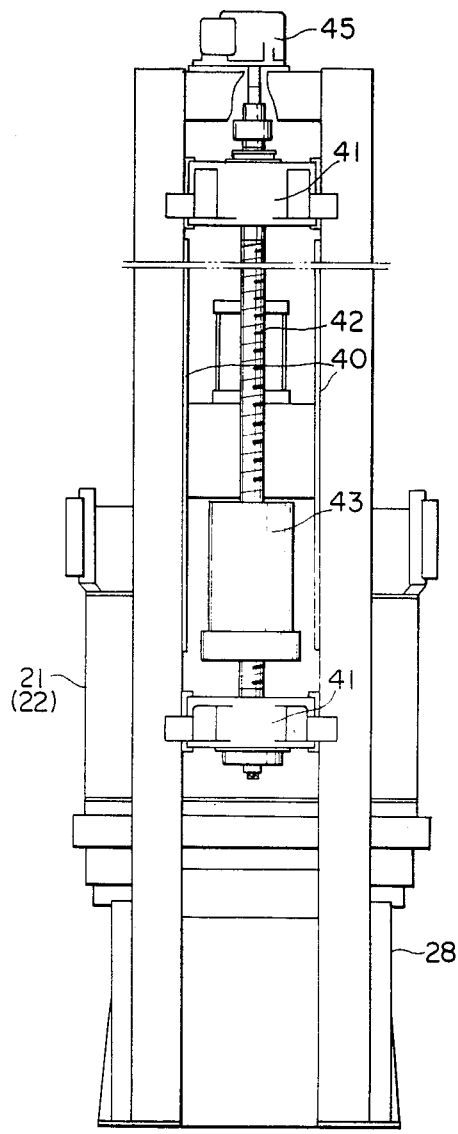
FIG. 2 is a side view of the tire curing press shown in FIG. 1.
Figure 3:
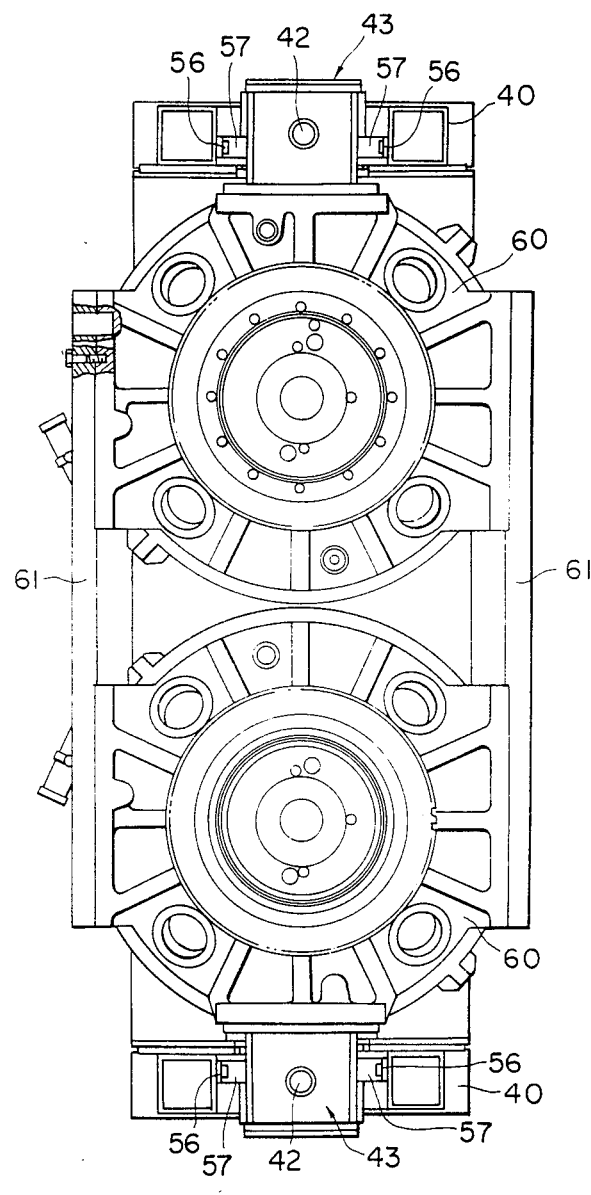
FIG. 3 is a plan view of the same tire curing press.

Referring to FIGS. 1 to 3, there is shown the general construction of a tire curing press to which the present invention is applicable, the tire curing press having a couple of sets of molds 21 and 22 juxtaposed on a press base 28 which in turn is fixed on an installation floor 29. Although a dual mold type tire curing press is shown in this particular embodiment, it is to be understood that the invention is applicable to tire curing presses which are provided with three or more sets of molds. As shown particularly in FIG. 1, the molds 21 and 22 are each provided with a lower mold cavity 23 which is resiliently supported on a press base 28, and an upper mold cavity 24 which is vertically movable toward and away from the lower mold cavity 23 and releasably closable on the latter. The lower mold cavity 23 includes a horizontal plate 26 which is disposed parallel with the upper surface of the press base 28 and an upright cylindrical wall 25 formed around the outer periphery of the horizontal plate 26 which is resiliently supported on the press base 28 through leaf springs 27 or the like. Likewise, the upper mold cavity 24 is constituted by a cylindrical wall 58 and a cap-like top wall 60, and vertically movably supported on side frames 40 which are erected on opposite sides of the press base 28 through lift means which will be described hereinbelow.

Figure 4:
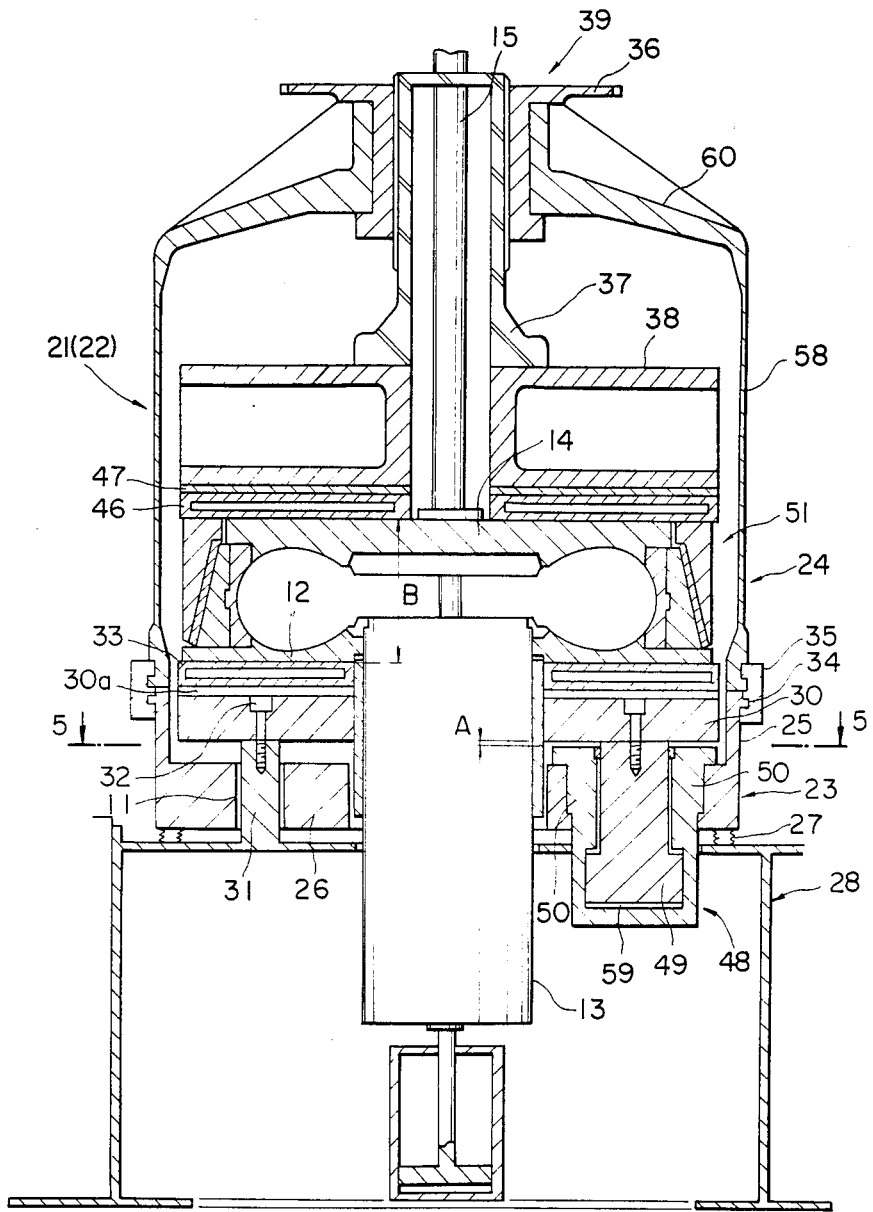
FIG. 4 is a partly sectioned front view of a mold clamp mechanism embodying the present invention.

Reference is now had to FIG. 4 for particulars of the construction of the upper and lower mold assemblies to receive split molds in the upper and lower mold cavities 24 and 23. The horizontal plate 26 of the lower mold cavity 23, which is resiliently supported on the press base 28 through leaf springs 27 or the like, is provided with a number of apertures 11 (four in the particular embodiment shown) at equidistant positions around the center of the plate (or press center) as shown particularly in FIG. 5 which is a sectional taken on line V—V of FIG. 4. Slidably received in the apertures 11 through bushings or the like are the same number of connecting support rods 31 which are fixedly provided on the press base 28 in alignment with respective apertures 11. A lower platen support 30 is securely fixed to the lower ends of the support rods 31 by mounting bolts 32. In a manner well known in the art, a lower platen 33 is mounted on top of the lower platen support 30 in an overlapping fashion through heat insulating material 30a, and a lower mold 12 is mounted on the lower platen 33. Namely, the lower mold assembly including the lower platen support 30, heat insulating material 30a, lower platen 33 and lower mold 12 is fixed to the press base 28 through the linkage of the support 30 and connecting support rods 31. Provided at the center position on the press base 28 is a center mechanism 13 including, as well known in the art, a bladder which is contractably expansible in contact with the inner surface of a green tire and means for feeding a hot pressure medium into the bladder as a vulcanizing heat source. The center mechanism 13 is movable up and down through the press base 28, lower mold cavity 23 and lower mold assembly, and designed to eject a vulcanized tire from the lower mold by the bladder in the same manner as in the conventional tire curing machine. The construction of the bladder itself and the mechanism for contractably expanding the bladder are omitted from the description and drawings since they may be of conventional designs.

A center mechanism 39 is mounted likewise centrally on the top wall 60 which is formed contiguously to the cylindrical wall 58 of the upper mold cavity 24, occupying the press center in a vis-a-vis relation with the aforementioned center mechanism 13 in the lower mold cavity 23. As shown in FIG. 4, the center mechanism 39 is provided with a mold height adjusting mechanism including an adjusting nut 36 which is rotatably fitted in a neck portion 60 of the cylindrical wall 58 and in threaded engagement with an adjusting screw cylinder 37 so that the cylinder 37 can be lifted up and down upon rotating the adjusting nut 36 in forward and reverse directions, respectively. The upper platen support 38 is securely fixed to the lower end of the screw cylinder 37, and the upper platen 46 is fixed to the lower side of the platen support 38 through a heat insulating material 47, mounting the upper mold 14 on the upper platen 46. The upper mold 14 is connected to a piston rod 15 which is extended through the center of the center mechanism 39. Although not shown in the drawings, the piston rod 15 forms a part of a hydraulic piston-cylinder which is mounted on the center mechanism 39. The upper mold assembly is arranged in the above-described manner, so that a split mold for vulcanizing a green tire is constituted by the upper and lower molds 12 and 14. The upper and lower platens 46 and 33 are supplied with steam or other heating medium as a vulcanizing heat source in the manner well known in the art.

In the particular embodiment shown, the mold is opened and closed by vertically moving the upper mold cavity 24 together with the upper mold assembly relative to the lower mold cavity 23 through the mechanism as shown in FIG. 1 to 3. Namely, in order to open and close simultaneously a couple of upper mold cavities 24 are utilized corresponding to a couple of corresponding lower mold cavities 23, the top walls 60 of the juxtaposed upper mold cavities 24 are integrally connected with each other by means of a link member 61 as shown in FIG. 3, and a couple of screw shafts 42 are mounted on the side frames 40 on the opposite sides of the press base 28 through bearing boxes 41 for rotation in forward and reverse directions. As shown in FIG. 2, the screw shafts 42 are threadedly engaged with ball screw nuts in lift supports 43 which are fixedly mounted at one side of the upper mold cavities 24 so that the lift supports 43 can be vertically moved up and down upon rotating the screw shafts 42 in forward and reverse directions to thereby open and close the upper mold cavities 24 relative to the lower mold cavities 23. In this instance, the aforementioned lift supports 43 are each provided with slide guides 57 as shown particularly in FIG. 3 for engagement with guide rails 56 which are provided on part of the side frames 40. The screw shafts 42 are rotated by means of a rotational shaft 44 which is mounted on the side frames 40 and arranged to transmit the rotational force of a motor (not shown) to the screw shafts 42 through a reducer 45, as exemplified in FIGS. 1 and 2, to rotate the two screw shafts 42 in synchronism with each other.

Figure 6:
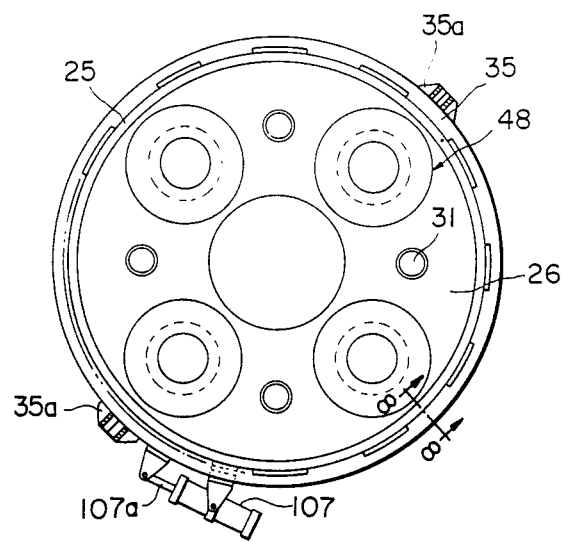
FIG. 6 is a sectional view taken on line VI—VI of FIG. 1.
Figure 7:
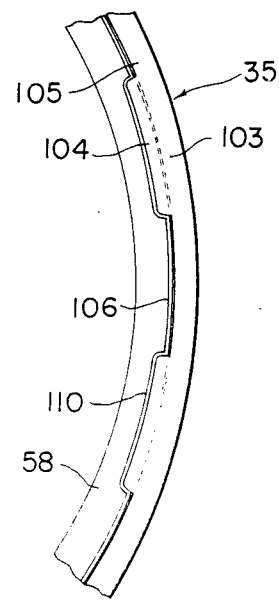
FIG. 7 is a fragmentary plan view of a lock mechanism.
Figure 8:
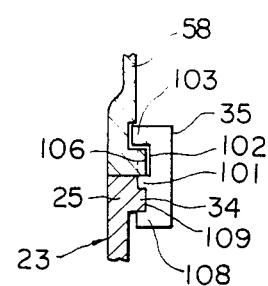
FIG. 8 is a cross-sectional view taken on line VIII—VIII of FIG. 6.

As illustrated in FIGS. 1 and 4, the mold clamp mechanism of the invention further includes a mechanical lock means which is constituted by a lock ring 35 in the particular embodiment shown, to thereby lock or unlock and closed upper and lower mold cavities 24 and 23 into or out of a joined state. The construction of the lock ring 35 is shown in FIGS. 4 and 6 (a sectional view taken on line VI—VI of FIG. 1) to 8. More specifically, the lock ring 35 is provided with an annular groove 109 on the inner periphery thereof between an inwardly projecting locking rim 108 formed around its lower inner edge and a similarly inwardly projecting locking rim 101 formed around its inner periphery above the rim 108. The annular groove 109 of the lock ring 35 is rotatably fitted on a flanged wall 34 which is projected radially outward from outer periphery of the cylindrical wall 25 of the lower mold cavity 23 at a level close to its upper end to support the lock ring 35 thereon. Similarly, an annular locking groove 102 is formed on the inner periphery of the lock ring 35 between the locking rim 101 and an upper rim 103 which is alternately provided with inwardly projecting toothed portions 104 and indented or blank portions 105 on the inner periphery thereof as shown particularly in FIG. 7. On the other hand, formed alternately around the outer periphery at the lower end of the cylindrical wall 58 of the upper mold cavity 24 are indented or blank portions 110 which are passable through the toothed portions 104 on the lock ring 35 and outwardly projecting tooth portions 106 which are passable through the indented blank portions 105 and engageable with the toothed portions 104 of the ring 35. In order to rotate the lock ring 35 in forward and reverse directions in locking and unlocking operations, a rotary member such as a rotary cylinder 107 is mounted on the cylindrical wall 25 of the lower mold cavity 23 with its actuator rod 107a connected to the lock ring 35 as shown in FIG. 6. Therefore, when the lock ring 35 is in an open position, the toothed portions 104 on the ring 35 opposed the indented blank portions 110 on the cylindrical wall 58 as the upper mold cavity 24 is lowered, and the indented blank potions 105 on the ring 35 confront the toothed portions 106 on the cylindrical wall 58 of the upper mold cavity 24, as shown in FIG. 7. Accordingly, the lower end of the cylindrical wall 58 is allowed to pass through the toothed portions 104 of the ring 35 and engage with the locking groove 102 as shown in FIG. 8. In this state, the upper and lower mold cavities are locked to each other upon turning the lock ring 35 by the actuator rod 107a of the rotary member 107 in such a manner as to shift the toothed portions 104 of the ring 35 into vertically overlapping positions relative to the toothed portions 106 on the cylindrical wall 58. In this connection, it is possible to resort to lock means other than the lock ring 35 which is exemplified in the drawings. In this particular embodiment shown, a split type lock ring 35 employed to facilitate its mounting and the reference numeral 35a in FIG. 6 denotes its joint portion.

Figure 5:
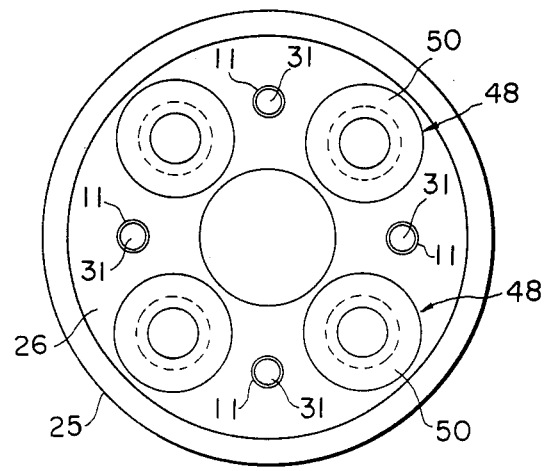
FIG. 5 is a sectional view taken on line V—V of FIG. 4.

According to the present invention, the upper and lower mold assemblies in the upper and lower mold cavities 24 and 25 which are locked in closed position in the above-described manner are clamped by the clamp means shown in FIGS. 1, 4 and 5. More specifically, in uniformly distributed positions around the press center, cylinders 50 of a suitable number of hydraulic cylinder assemblies (four in the particular embodiment shown) are mounted on the horizontal plate 26 of the lower mold cavity 23 which is resiliently supported on the press base 28 through leaf springs 27 or the like, and piston rods 49 of the cylinder assemblies 48 are fixedly secured to the aforementioned lower platen support 30 of the lower mold assembly by mounting bolts 50a. In FIG. 4, reference numeral 51 denotes a split mold assembly with upper and lower molds 12 and 14.

The mold clamp mechanism according to the invention is operated in the following manner. In order to open the upper mold cavity 24 and upper mold 14 after completion of one cycle of tire curing operation, the mold lock is released by turning the lock ring 35 in a releasing direction, shifting the toothed portions 104 of the ring 35 away from the toothed portions 106 on the cylindrical wall 58 of the upper mold cavity 24 into positions which are vertically aligned with the indented blank portions 110 of the wall 58. Thereafter, the screw shafts 42 on the side frames 40 are rotated in an opening direction to elevate the lift support 43, retracting the mold cavity 24 and upper mold 14 into an upper fully-opened position. In this fully-opened state, the cured tire is ejected by operation of the center mechanism in the conventional manner, namely, by lifting up the tire from the lower mold 12, removing the bladder and discharging the tire out of the machine by an unloader. Therefore, in the next phase of operation, a new green tire is delivered and set in position by operation of a loader, and the center mechanism 39 is lowered to fit the bladder in the green tire for contact with the inner surface thereof and preshape the tire by feeding a hot pressure medium such as steam into the bladder. Simultaneously, the upper mold cavity 24 is lowered and closed on the lower mold cavity 23 to join the upper and lower molds 12 and 14 together. In a situation where the upper mold 14 is an assembled type consisting of a top mold and a side mold as shown in FIG. 4, the mold assembly is pushed down by the piston rod 15 and retained in that state until the upper platen 46 comes into contact with the upper surface of the top mold as a result of lowering of the upper mold cavity 24 by the screw rods 42. After this, the whole mold assembly is lowered integrally, together with the loaded green tire. Immediately before complete closure of the molds, the force F2 which is downwardly applied by the screw rods 42 which tend to lower the upper mold cavity and lower mold 14 should be greater than the downward force F1 of the piston rod 15 which acts to close the split mold. Upon complete closure, lowering of the upper mold cavity 24 is stopped. At this time, the toothed portions 106 at the lower end of the cylindrical wall 58 of the upper mold cavity 24 are positioned in vertical alignment with the indented blank portions 105 of the lock ring 35 in a released position so that the lower end of the wall 58 may be lowered and fit in the locking groove 102 of the lock ring 35 as shown in FIG. 8. Accordingly, the stopped upper mold cavity 24 is integrally locked to the lower mold cavity 23 by engagement of the toothed portions 104 and 106 upon turning the lock ring 35 in a locking direction. In the next phase of operation, a high fluid pressure (hydraulic pressure) is supplied to the cylinders 50 of the hydraulic cylinder assemblies 48, into head end spacers 59 which are provided beneath the piston rods 49 as shown in FIG. 4, whereupon the cylinders 50 are moved downwardly against the action of the springs 27. As a result, the lower mold cavity 23 is also moved downward integrally with the cylinders 50, and the upper mold cavity 24 which is locked to the lower mold cavity 23 through the lock ring 35 is pulled downward to apply a clamping force on the split mold assembly 51. In this clamped state, the tire is cured to shape with heating by the upper and lower platens 33 and 46 and application of internal pressure. Should the fluid pressure in the cylinder assemblies 48 be drained for some reason during a vulcanizing operation, the clearance A which exists between the upper surface of the cylinders 50 and the underside of the lower platen support 30 as indicated in FIG. 4 would become zero. This is due to the fact that the cylinders 50 are pulled upward by the pressure of steam or other tire vulcanizing medium. The height of the mold which is indicated at B in FIG. 4 can be easily adjusted by turning the aforementioned adjusting nut 36 which is in engagement with the screw cylinder 37 on the upper mold cavity 24.

One of the greatest advantages of the mold clamp mechanism according to the present invention resides in the fact that the lower platen 33 which determines the position of the lower mold 12 is securely fixed to the press base 28 and the lower mold cavity 23 is resiliently and downwardly movably supported by the fluid cylinder assemblies 48 interposed between the lower platen 33 and mold cavity 23 to apply a strong mold clamping pressure through the lower mold without impairing the concentricity and parallelism of the upper and lower molds. In closing and clamping upper and lower molds of a split mold assembly 51 in this sort of tire curing machine, the conventional method in which a pressure is applied from above through a beam or from a lateral side often suffers from such problems as flexure and bending deformation of misalignment of the split molds under the clamping pressure. In order to preclude these problems and to have uniform pressurization, it is advantageous to employ a direct clamping method for pushing up the split molds from beneath. However, if it is attempted to effect the direct clamping by mounting the lower platen vertically movably on the press base and directly connecting the piton rods of hydraulic cylinders to the lower side of the platen, it will become difficult to maintain concentricity and parallelism, which are prerequisites to alignment of the upper mold with the lower mold, throughout the repeated upward and downward movements of the upper mold in a high temperature environment. In such a case, the upper mold will easily loose stability, suffering from shifts in position, misalignment and inclination even in a relatively short time period of use. Moreover, the construction becomes extremely complicated due to an uneviable necessity of providing facilities for feeding a vulcanizing heating medium on the side of the platen, including pipe fittings which are movable with the platen. It is obviously disadvantageous to mount such pipe fittings on a movable part in view of the strength in design and perfect seals which would be required.

According to the present invention, the lower platen 33 is always fixed on the press base 28 in a stable and secure state, while lifting up and down the lower mold cavity 23 occurs on a resilient support. This mold cavity pulling-down method is extremely advantageous as allowing direct pressurization from the lower mold. By so doing, the upper and lower molds are brought into perfect alignment with each other, and concentricity and parallelism of the molds are maintained with high accuracy, thus improving the degree of precision of vulcanization to a considerable degree by precluding flexure, deformation and positional deviations or misalignment of the molds. Since the lower mold in free state is floated upward to provide an allowance for the pull-down of the lower mold, by floatingly supporting the lower mold cavity 23 on the press base 28 through leaf springs 27 or the like, the stroke length of the hydraulic cylinder assemblies 48 which are provided between the lower platen 33 and mold cavity 23 may be very short, e.g., in the range of about 5 to 10 mm. Therefore, the hydraulic cylinder assemblies 48 can be designed so as to have a compact construction which would not protrude over a great length beneath the press base. Namely, ample space can be left under the press base 28 to facilitate the mounting or installation of necessary pipe fittings. Further, there is no necessity of providing special cooling equipment for the cylinder assemblies 48, facilitating the installation and maintenance of pipings to the lower platen 33. As clear from the particular example shown, the mold clamp mechanism of the present invention is relatively simple in construction and excellent in performance quality.

Obviously, numerous modifications and variations of the present invention are possible in light of the above teachings. It is therefore to be understood that within the scope of the appended claims, the invention may be practiced otherwise than as specifically described herein.

What is claimed is:

1. A mold clamping mechanism for a tire curing press, comprising:
    a press base;
    a platen support fixed to said press base;
    a lower mold cavity positioned above said press base and surrounding said platen support;
    a lower mold positioned on said platen support;
    an upper mold cavity having an upper mold positioned therein and opposingly mounted to said lower mold cavity and vertically movable toward and away from said lower mold cavity;
    a center mechanism provided at the center of said upper and lower mold cavities, respectively;
    lock means for releasably locking said upper and lower mold cavities to each other;
    mold pressing means located beneath and connected to said lower mold cavity and connected to said upper mold cavity via said lock means for simultaneously pressing said lower and upper mold cavity downwardly; and
    means for resiliently supporting said lower mold cavity on said press base.

2. A mold clamp mechanism as set forth in claim 1, wherein said lower mold cavity further comprises a horizontal plate disposed parallel with said press base and an upright cylindrical wall rising from an outer periphery of said horizontal plate, and wherein said means for resiliently supporting said lower mold cavity on said press base further comprises spring means.

3. A mold clamp mechanism as set forth in claim 2, wherein said horizontal plate 26 of said lower mold cavity is provided with a plurality of apertures and further comprises a corresponding number of connecting rods positioned in said plurality of apertures for securely fixing said platen support of said lower mold to said press base.

4. A mold clamp mechanism as set forth in claim 1, 2 or 3, wherein said mold pressing means further comprises a plurality of movable fluid hydraulic cylinders mounted on said horizontal plate at uniformly distributed positions around the press center and having respective piston rods securely fixed to an underside portion of said platen support.

5. A mold clamp mechanism as set forth in claim 1, wherein said lock means further comprises a lock ring rotatably fitted on said lower mold cavity and releasably interlockable with said upper mold cavity, and means for turning said lock ring into and out of a locking position relative to said upper mold cavity.

6. A mold clamp mechanism as set forth in claim 1, further comprises means for fixing said lower mold to said press base.

* * * * *